June 2, 1953　　　A. M. CASABONA　　　2,640,982
PULSE NAVAGLIDE SYSTEM
Filed April 17, 1948　　　　　　　　　　　　　　　4 Sheets-Sheet 1

INVENTOR.
ANTHONY M. CASABONA
BY
ATTORNEY

June 2, 1953     A. M. CASABONA     2,640,982
PULSE NAVAGLIDE SYSTEM
Filed April 17, 1948     4 Sheets-Sheet 3
*Fig. 3.*
VECTOR ANALYSIS OF PULSE SHAPES SHOWN IN FIG. 2
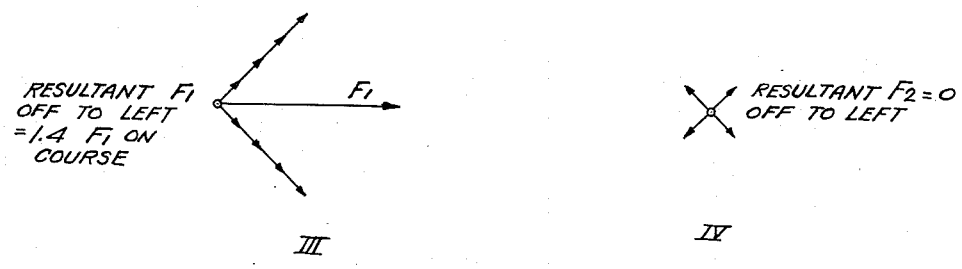
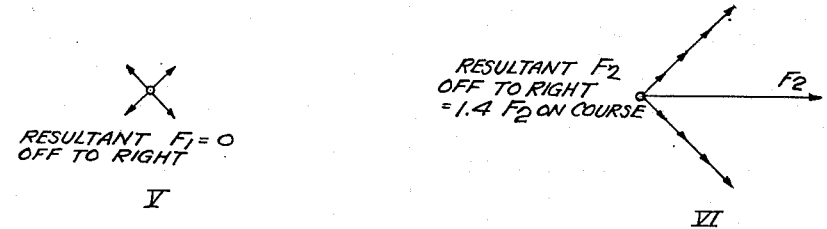
ANALYSIS OF UNIT PULSE
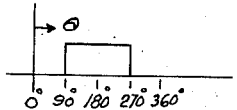
RISING EDGE IS +
FALLING EDGE IS −
VII
INVENTOR.
ANTHONY M. CASABONA
BY
*R. R. Morris*
ATTORNEY June 2, 1953  A. M. CASABONA  2,640,982
PULSE NAVAGLIDE SYSTEM
Filed April 17, 1948  4 Sheets-Sheet 4
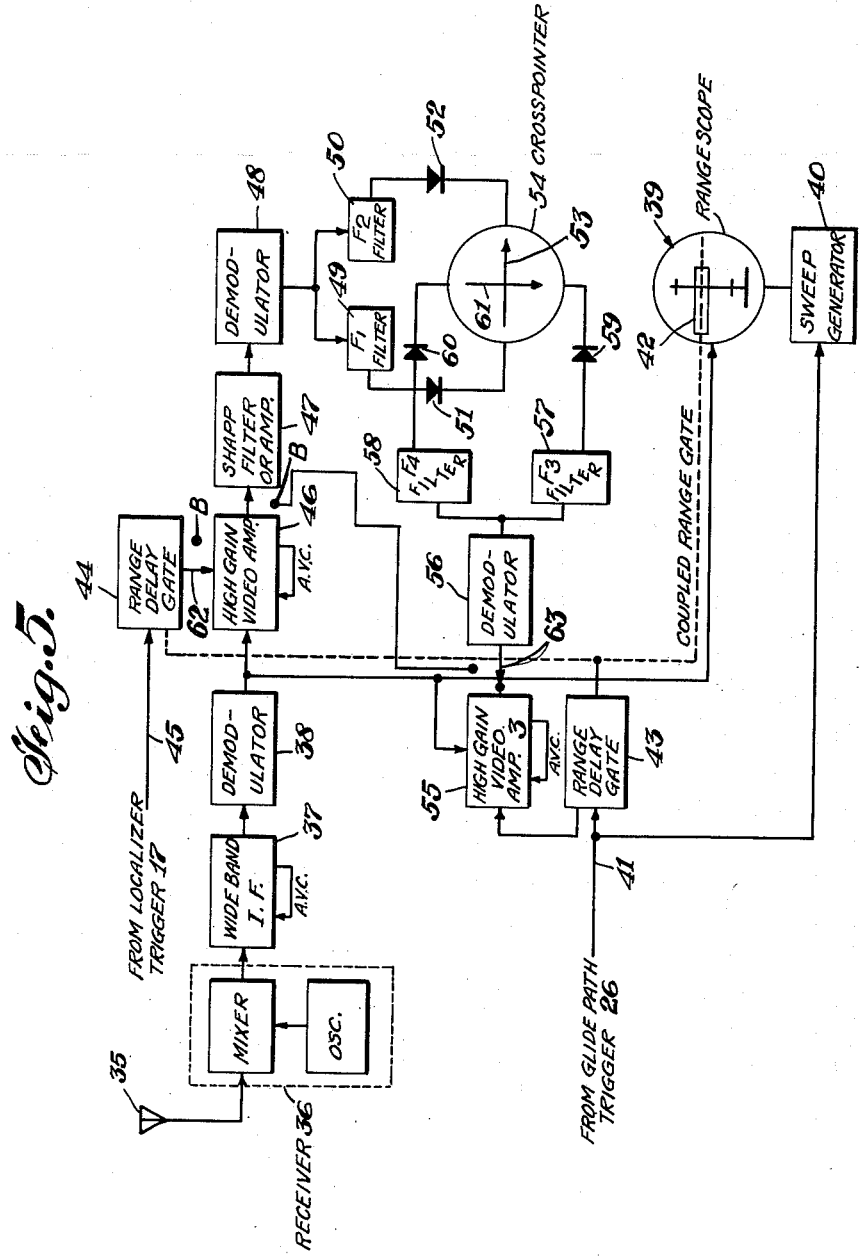
INVENTOR.
ANTHONY M. CASABONA
BY
ATTORNEY Patented June 2, 1953

2,640,982

UNITED STATES PATENT OFFICE 2,640,982

PULSE NAVAGLIDE SYSTEM

Anthony M. Casabona, Hawthorne, N. Y., assignor to International Standard Electric Corporation, New York, N. Y., a corporation of Delaware Application April 17, 1948, Serial No. 21,655

17 Claims. (Cl. 343—6)

This invention relates to radio navigation systems and particularly to an arrangement for determining (on a mobile craft or at a fixed station) the position of the mobile craft with respect to a given course.

Radiant energy systems for guiding mobile craft such as aircraft with respect to a prescribed course are well known. In locations wherein considerable aircraft traffic is experienced, as in connection with the landing of aircraft on a runway, it is desirable that the information given to mobile craft to enable it to make an instrument landing be reproduced on the ground for purposes of monitoring, traffic control, and for emergency talk-down procedure. Normal operation of ground equipment providing these facilities is usually derived from the pulse response of an aircraft either of the cooperative or passive type.

An object of this invention is to provide a novel navigation system utilizing complex pulse pattern radiations from a ground station for radar detection of aircraft and also for providing navigational information aboard said aircraft and/or at a ground station of the position of said craft with respect to a prescribed course effectively determined by said pulse pattern radiations.

This invention contemplates a combined radar and beacon system for defining a course and determining the position of a craft with respect to the course including a pair of antennas spaced apart transversely of the course, and an energizing source for the antennas, including a radio frequency source modulated by pulses to produce distinctive outputs and a combining circuit of groups of circuits for combining the distinctive outputs to supply different distinctive combined outputs to the respective antennas.

The radiated complex pulse patterns serve on the craft to define a course in the normal manner. The energy returned to the transmitting point by reradiation either by reflection or repeating, is received to provide a relative indication of the craft's position with respect to the course and its distance along the course.

In accordance with an embodiment of my invention a pulse transmitting system comprises two antennas which are installed one on each side of the runway in the vicinity of the point of contact for landing for providing azimuth tracking of the aircraft. The antennas are spaced apart a desired fraction of a wave length which determines the sub-carrier frequency component of the pulse envelope to be used. Complex pulses of varying intensity and different timing are produced and then radiated from each of said antennas to provide effectively a radiation pattern defining a desired course. The radiated complex pulse patterns when received aboard the aircraft and processed provide the normal localizer information. Also, the radiated complex pulse patterns upon reception at the transmitting station after being reverted from said aircraft are processed to yield azimuth and range information of the aircraft with respect to said course. For providing elevation tracking of the aircraft an elevation antenna system corresponding to a glidepath radiation is provided on one side of the runway. The elevation antenna system comprises two antennas spaced apart in the vertical. The pulse energy transmitted from elevation antenna system comprises uniform pulses having characteristic modulations for each of the elevation antennae. These glidepath pulses when received aboard the aircraft, or after being reverted, at the ground station provide the desired elevation tracking control.

The above-mentioned and other features and objects of the invention will become more apparent and the invention itself though not necessarily defined by said features and objects will be clearly understood by reference to the following description of an embodiment of the invention taken in connection with the accompanying drawings wherein:

Fig. 3 shows in vector form an analysis of the complex pulses shown in Fig. 2.

Fig. 4 shows in block diagram form the ground transmitting arrangement for providing the glidepath course.

Fig. 5 shows the ground station radar receiver for providing the desired glidepath, localizer and range information of the approaching aircraft.

Figure 1:
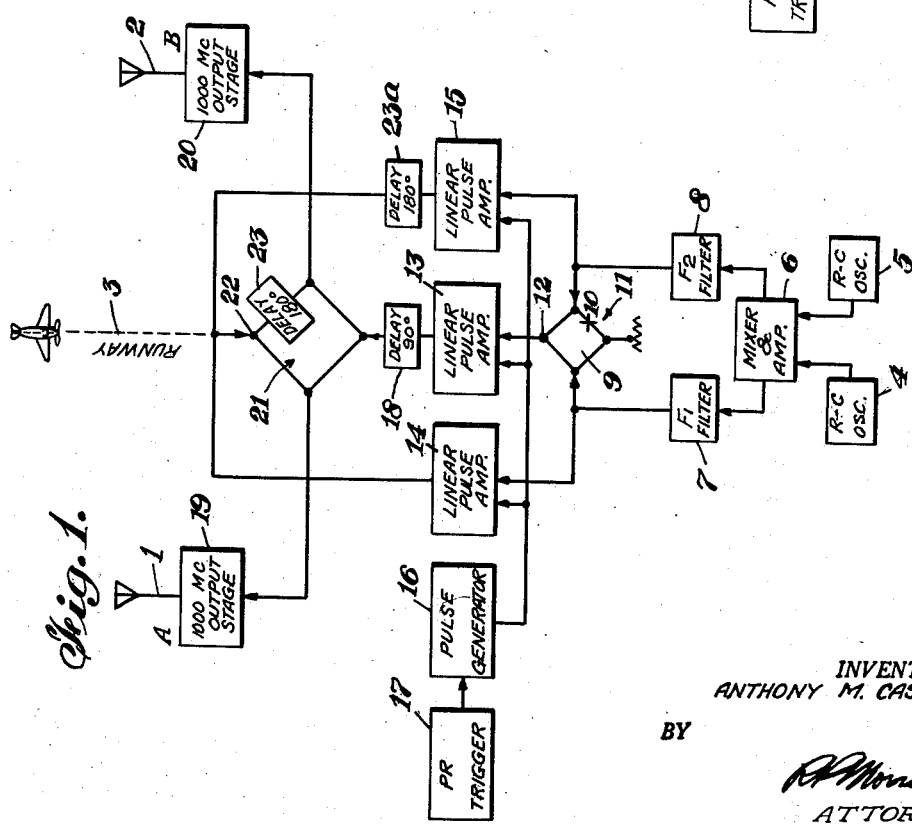
Fig. 1 shows in block diagram form a ground station arranged for providing the complex pulse patterns determining the localizer course.

Referring to Fig. 1 there is shown a transmitting system for providing complex pulse patterns defining a prescribed localizer course. The antennas 1 and 2 are provided spaced symmetrically on each side of the runway 3 in the vicinity of the point of contact of aircraft upon landing. The two antennas are spaced apart a fraction of a wave length at a given sub-carrier frequency. The localizer patterns are formed in the detector of the receiver utilizing the subcarrier frequency which is contained as a component of the pulses transmitted from antennas 1 and 2. The pulse width and repetition rate of the transmitted pulses are chosen so as to favor the sub-carrier frequency.

The audio modulation frequency signals F1 and F2 are produced by beating the outputs of the two RC oscillators 4 and 5 in the mixer circuit 6 so that their sum is equal to F1 and their difference to F2. The relative magnitudes will therefore remain constant. The F1 and F2 modulation frequency signals are applied through separate filter circuits 7 and 8 respectively to the opposite terminals 9 and 10 of an audio frequency bridge 11 that combines these modulation frequency signals at terminal 12, and prevents cross-modulation. The combined modulation frequency signals F1 and F2 from terminal 12 are applied to the linear pulse amplifier 13 which produces a pulse whose magnitude is proportional to the instantaneous value of the composite of the signals F1 and F2. Linear pulse amplifier 14 is modulated by F1 alone from terminal 9 and linear pulse amplifier 15 is modulated by F2 alone from terminal 10. All three pulse amplifiers 13, 14 and 15 are simultaneously triggered by a common pulse generator 16 and pulse recurrence trigger 17. Pulses from amplifier 13 are delayed 90° in circuit 18 for the sub-carrier frequency to be used (for example ½ microsecond for a sub-carrier frequency of ½ megacycle per second) and then energizes transmitters 19 and 20 simultaneously by means of the bridge 21. Since antennas 1 and 2 are directly coupled to transmitters 19 and 20 respectively, this constitutes an in-phase sub-carrier modulation of transmitters 19 and 20. Pulses applied to the upper terminal 22 of the bridge 21 from pulse amplifiers 14 and 15 are delayed 180° in circuit 23 (or one microsecond for a sub-carrier frequency of ½ megacycle per second) before energizing transmitter 20 so that these pulses constitute an out-of-phase sub-carrier modulation of transmitters 19 and 20. The F2 modulated pulses from pulse amplifier 15 are delayed an additional 180° in circuit 23a in order to supply the desired sub-carrier pattern.

Figure 2:
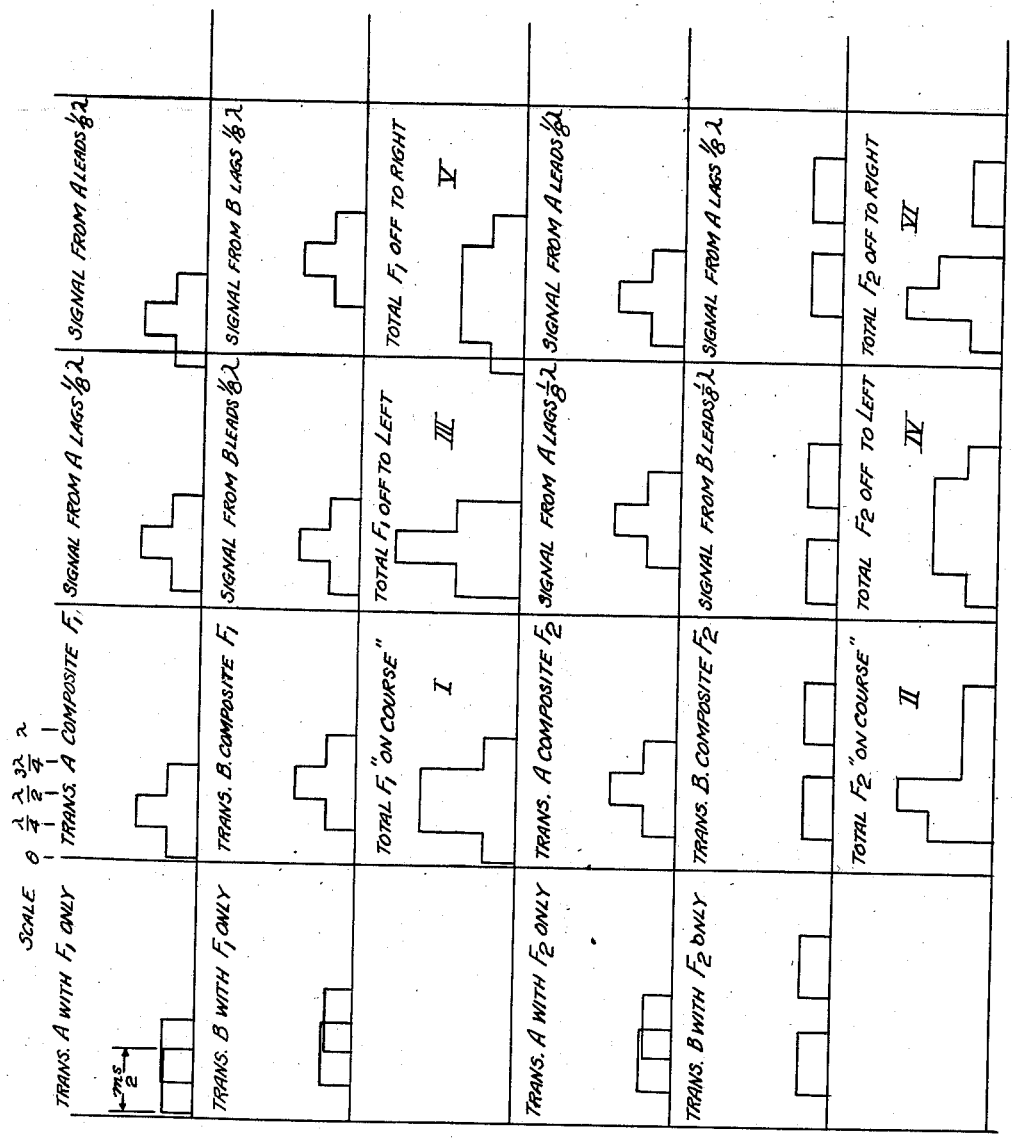
Fig. 2 shows the time relations between the localizer pulses being transmitted from the two localizer antennas under varying conditions as specified.

Fig. 2 shows the time relation between pulses being transmitted from transmitters 19 and 20 under various conditions as specified. These time relations are obtained from the block diagram of Fig. 1 wherein the pulse from each of the three amplifiers, 13 through 15 is delayed through the various time delays and then added to obtain the composite pulse for application to each transmitter. These are shown in the second vertical row of the pulse diagrams of Fig. 2.

When the pulses radiated from antennas 1 and 2 are added at a receiver with no change in timing between them the composite pulse pattern obtained is that which is received "on-course." When the pulses from transmitters 19 and 20 are added with a ¼ microsecond lag (corresponding to 45° at ½ megacycle) in transmitter 19 and ¼ microsecond lead in transmitter 20, there results the composite pulse pattern "off to left." With the lag and lead interchanged between transmitters 19 and 20, simulating an off-course position to the opposite side, a composite pulse pattern "off to right" is obtained. These composite pulse patterns are analyzed vectorially in Fig. 3 considering ½ megacycle per second as the sub-carrier frequency of interest. A vector system such as demonstrated at the bottom of Fig. 3 can be assumed. Since one microsecond constitutes a half wave of ½ megacycle per second energy, the leading and trailing edges of a microsecond pulse will produce in phase components of the ½ megacycle per second signals when they excite a sharp filter or tuned amplifier. Each rising edge may therefore be considered as a positive unit vector and each falling edge as a negative unit vector and when plotted in the correct time relation will produce the vector diagram shown at the bottom of Fig. 3. This, then, is the equivalent of a unit pulse. From Fig. 3 we see that equal amounts of F1 and F2 are obtained on course and that F1 goes up to 1.4 times the "on-course" magnitude at a point "off-course" at which F2 drops to zero. (This occurs approximately 34° off course for the particular arrangement involved.) As can be clearly seen from Fig. 3, the magnitudes of F1 and F2 reverse at a symmetrical point to the other side of the course. Reference is made by roman numeral under each vector diagram to the corresponding pulse pattern in Fig. 2.

The glidepath arrangement herein described is identical in principle to that described in the copending application of C. Watts Serial No. 12,001 entitled Glide Path Antenna and filed February 28, 1948, now Patent No. 2,610,321. The carrier transmitter 24 Fig. 4 is pulsed by means of the pulse generator 25 and pulse recurrence trigger 26 after amplification in pulse amplifier 27 at a repetition rate different from and with no harmonic relation to the repetition rate of the previously described localizer arrangement. The pulsed carrier output from 24 is fed to a cross-modulation bridge 28 operating in the standard manner. A mechanical modulator 29 is utilized for modulating the pulse carrier outputs available in leads 30 and 31 with different modulation frequencies F3 and F4. Since the modulation frequencies must be necessarily low in comparison with the pulse repetition rate, a mechanical modulator such as 29 may be utilized. The modulating troughs vary the pulse heights in accordance with the instantaneous values of F3 and F4 respectively. These pulses are combined in a standard antenna bridge 32 which feeds pulsed side bands of F3 and F4 to the upper antenna 33 and pulsed modulated carrier to the lower antenna 34. It should be noted the glidepath arrangement makes use of simple pulse transmissions. This is made possible because of the practicability of closer spacing of the glidepath antennas whereby the carrier frequency components may be utilized to determine the glidepath pattern. The localizer on the other hand requires relatively large spacing because of the runway breadth and hence necessitates the processing of a sub-carrier frequency to provide the desired course.

The block diagram of the ground receiver is shown in Fig. 5. The localizer and glidepath signals after reception in the receiving antenna 35 are superheterodyned in unit 36 to an intermediate frequency. The intermediate frequency signals are amplified in wide band amplifier 37, preferably equipped with automatic volume control. After demodulation in circuit 38 the signals consist of all reflected pulses originating at the localizer and glidepath arrangements previously described. One output from demodulator 38 is applied to the range indicator 39 comprising a cathode ray oscilloscope whose sweep generator 40 is synchronized with the glidepath recurrence trigger over line 41. The localizer echoes therefore will not lock in and be visible.

The glidepath echoes will show the presence and range of each aircraft at the approach area. A cursor 42 is provided for the range oscilloscope 39 so that it can be set to coincide with any selected indication. The cursor is coupled to the two range delay gates 43 and 44 so that only pulses coming from the range of the chosen aircraft are admitted. Range gate 44 which is synchronized with the localizer pulse recurrence trigger over line 45 will therefore only admit localizer echoes from the chosen aircraft to the video amplifier 46 from the demodulator 38. These echoes are identical to those being received in the aircraft receiver and will produce a course indication as previously disclosed in connection with Figs. 2 and 3. After amplification in 46 the pulses are used to excite one or more sharp filter or tuned amplifiers 47 tuned to the subcarrier frequency and the chosen harmonics. Demodulation in demodulator 48 of this latter signal produce components of F1 and F2 which define the aircraft deviation from course. After passing filters in 49 and 50 rectifiers 51 and 52 respectively the F1 and F2 components are applied to control one cross pointer needle 53 of the cross pointer indicator 54. Video amplifier 46 comprises an automatic volume control arrangement such that a constant filter voltage is maintained for the localizer indications.

Range delay gate 43 is synchronized with the glidepath pulse recurrence trigger over line 41 so that video amplifier 55 accepts only glidepath echoes from the chosen aircraft and available in the output of demodulator 38. After amplification in 55 the envelope of the selected glidepath pulses is obtained from detector 56 which gives components of F3 and F4 at the outputs of filters 57 and 58 respectively. These components define the aircraft deviation from the prescribed glidepath. After rectification in rectifiers 59 and 60 the F3 and F4 components are applied to control another cross pointer needle 61 of the cross pointer indicator 54. An automatic volume control arrangement may be provided in amplifier 55 to maintain a constant filter voltage for the glidepath indications. The airborne receiver for obtaining indications in the aircraft would be similar to that shown in Fig. 5 with the elimination of range gates 43, 44, sweep generator 40, range scope 39 and video amplifier 55. Demodulator 56 would receive its signal from the output of video amplifier 46 with switches 62 and 63 in position B. In effect therefore the cross pointer indication which is available in the aircraft is also reproduced on the ground with equal accuracy and sharpness. As desired in place of a cross pointer these indications could be displayed on an L or similar type scope so that the range and the deviation from the landing beam may be read simultaneously.

While I have described above the principles of my invention in connection with specific apparatus, and particular modifications thereof, it is to be clearly understood that this description is made only by way of example and not as a limitation on the scope of my invention.

What is claimed is:

1. A radar and beacon system for defining a course and determining the position of a craft with respect to said course comprising a pair of antennas spaced apart transversely of said course, a source of pulse energy, and a source of carrier frequency energy, modulator means for modulating said carrier frequency energy with said pulse energy to derive distinctive pulse modulated outputs thereof, combining means for combining said pulse modulated outputs to provide two distinctive combined outputs and coupling means for applying said distinctive combined outputs to respective ones of said antennas for radiation therefrom.

2. A system according to claim 1, wherein said beacon system is a glidepath beacon and said pair of antennas comprises an upper and lower antenna spaced apart vertically, and said modulator means further comprises a source of distinctive modulation frequency energies, and means for modulating said pulse modulated carrier frequency with separate ones of said modulation energies to derive said distinctive pulse modulated outputs.

3. A system according to claim 2, wherein said combined means comprises means for combining said distinctive pulse modulated outputs to derive separate vector sum and difference components thereof, and means for applying said separate components to the upper and lower antennas respectively.

4. A system according to claim 1, further comprising receiver means aboard said craft for receiving said radiated combined outputs, and means for processing said received outputs to determine the position of said craft with respect to said course.

5. A system according to claim 1, further comprising receiver means located at a fixed station adjacent said course for receiving said radiated combined outputs after being reverted from an aircraft, and means for processing said received outputs to determine the position of said craft with respect to said course.

6. A system according to claim 1, wherein said beacon system is a localizer beacon, and said pair of antennas comprise antennas spaced apart in the horizontal a fraction of a wavelength at a given sub-harmonic frequency of said carrier frequency and related to the frequency content of transmitted pulse patterns.

7. A system according to claim 6, wherein said combining means comprises means for timing said pulse modulated outputs to provide distinctive complex pulse patterns, and means for applying said distinctive pulse patterns to separate ones of said antennas.

8. A system according to claim 7, wherein said means for timing said pulse modulated outputs to provide distinctive complex pulse patterns includes means to provide distinctive intensity and time duration characteristics.

9. A system according to claim 8, wherein said modulator means further comprises a source of distinctive modulation frequency energies and means for modulating each of said complex pulse patterns with separate ones of said distinctive modulation frequency energies to derive said two distinctive combined outputs.

10. A system according to claim 9, further comprising a receiver for receiving said radiated complex pulse patterns, means for demodulating said received pulse patterns to derive the sub-harmonic frequency components thereof, and means for demodulating said sub-harmonic frequency components to derive the modulation frequency components thereof, indicator means and means for applying said demodulated modulation frequency components to said indicator means for displaying the position of said craft with respect to said localizer course.

11. A radar and beacon system for defining a course and determining the position of a craft with respect to said course comprising a transmitter operating at a predetermined carrier frequency, a pair of antennas spaced apart transversely of said course a fraction of a wavelength at a given sub-harmonic frequency of said carrier frequency, a source of two distinct modulation frequency waves, a sources of pulse energy, first means for modulating said pulse energy with one of said modulation frequencies and means for applying said first modulated energy to one of said antennas in phase and to the other of said antennas in an opposite phase, second means for modulating the pulse energy from said source with the other of said modulating frequencies and means for delaying said second modulated energy 180 electrical degrees and means for applying said delayed second modulated energy to one of said antennas in a given phase and to the other antenna in an opposite phase, third modulator means for modulating the pulse energy from said source with both of said modulation frequencies, means for delaying said third modulated energy 90 electrical degrees and means for applying said last named energy to each of said antennas in the same phase.

12. A system according to claim 11, wherein each of said means for applying energy to said antennas comprise a source of carrier frequency energy, and means for modulating the carrier frequency energy of each antenna with the modulated energy applied to each antenna.

13. A radar and beacon system for defining a course and determining the position of a craft with respect to said course comprising a pair of antennas spaced apart in the horizontal transversely of said course a fraction of a wavelength at a given sub-harmonic frequency of the operating carrier frequency of said beacon, a source of energy pulses, a source of two distinct modulation frequency waves, separate sources of carrier frequency energy for each of said antennas, means for deriving two distinct complex pulse patterns comprising means for delaying each pulse from said pulse source 0 electrical degrees, 90 electrical degrees and 180 electrical degrees at said sub-harmonic frequency, means for separately modulating said 0 degree delayed pulse with one of said waves, and 180 degree delayed pulse with the other of said waves, and said 90 degree delayed pulse with both of said waves, means for combining all of said modulated delayed pulses to provide one of said complex pulse patterns, further means for delaying each pulse from said pulse energy source 90 electrical degrees, 180 electrical degrees, and 360 electrical degrees at said sub-harmonic frequency, means for separately modulating said 180 degree delayed pulse with one of said waves, said 360 degree delayed pulse with the other of said waves, and said 90° delayed pulse with both of said waves, means for combining all of said further modulated delayed pulses to provide the other of said complex pulse patterns, means for modulating the carrier frequency energy of said separate sources of energy with separate ones of said complex pulse patterns before application to respective one of said antennas for radiation therefrom.

14. A system according to claim 13, further comprising receiver means for receiving said radiated pulse patterns, means for demodulating said received patterns to derive the sub-harmonic frequency components thereof, means for demodulating said received sub-harmonic components to derive the modulation frequency components thereof, indicator means responsive to said demodulated modulation frequency components for indicating the position of said craft with respect to said course.

15. An arrangement according to claim 14, further comprising a glidepath beacon comprising a pair of spaced apart antennas, a source of pulse energy, a source of different modulation waves, means for modulating said last named pulse energy with said different ones of said different modulation waves to provide two distinct glidepath signals, means for energizing separate ones of said glidepath antennas with a different one of said glidepath signals for radiation therefrom.

16. A system according to claim 15, wherein said receiver is located at a fixed station adjacent said course and comprises a second indicator having a sweep generator synchronized with the pulse energy from said glidepath pulse energy source, means for applying the received glidepath signals after being reverted from an aircraft to said second indicator for indicating the range of said craft with respect to said station.

17. A system according to claim 16, wherein said receiver further comprises separate range delay gates synchronized with the pulses from said glidepath and localizer pulse energy sources respectively for selecting received pulses before application to the respective indicators.

ANTHONY M. CASABONA.

References Cited in the file of this patent

UNITED STATES PATENTS

| Number | Name | Date |
|---|---|---|
| 2,379,442 | Kandoian | July 3, 1945 |
| 2,424,984 | Hoffman | Aug. 5, 1947 |
| 2,426,218 | Hopgood | Aug. 26, 1947 |
| 2,436,796 | De Rosa | Mar. 2, 1948 |
| 2,444,452 | Labin | July 6, 1948 |
| 2,543,081 | Watts et al. | Feb. 27, 1951 |

FOREIGN PATENTS

| Number | Country | Date |
|---|---|---|
| 116,667 | Australia | Oct. 10, 1941 |